(12) United States Patent
Doyle

(10) Patent No.: US 11,755,977 B2
(45) Date of Patent: Sep. 12, 2023

(54) AUTOMATED PROJECT ASSESSMENT AND ENHANCEMENT

(71) Applicant: Billd, LLC, Austin, TX (US)

(72) Inventor: Christopher Lee Doyle, Austin, TX (US)

(73) Assignee: Billd, LLC, Austin, TX (US)

( * ) Notice: Subject to any disclaimer, the term of this patent is extended or adjusted under 35 U.S.C. 154(b) by 0 days.

(21) Appl. No.: 17/846,343

(22) Filed: Jun. 22, 2022

(65) Prior Publication Data

US 2022/0358429 A1 Nov. 10, 2022

Related U.S. Application Data

(63) Continuation-in-part of application No. 17/492,253, filed on Oct. 1, 2021.

(60) Provisional application No. 63/086,253, filed on Oct. 1, 2020.

(51) Int. Cl.
*G06Q 10/0639* (2023.01)
*G06Q 10/10* (2023.01)
*G06Q 40/03* (2023.01)

(52) U.S. Cl.
CPC ....... *G06Q 10/0639* (2013.01); *G06Q 10/103* (2013.01); *G06Q 40/03* (2023.01)

(58) Field of Classification Search
None
See application file for complete search history.

(56) References Cited

U.S. PATENT DOCUMENTS

| | | | |
|---|---|---|---|
| 10,963,960 B1 | 3/2021 | Kushner et al. | |
| 2002/0107788 A1 | 8/2002 | Cunningham | |
| 2013/0332202 A1 | 12/2013 | Downs | |
| 2015/0363874 A1 * | 12/2015 | Wallander | G06Q 40/03 705/38 |
| 2016/0140474 A1 * | 5/2016 | Vekker | G06Q 10/06393 705/7.39 |
| 2017/0116560 A1 | 4/2017 | Wickstrom et al. | |
| 2018/0189706 A1 * | 7/2018 | Newhouse | G06Q 10/101 |

(Continued)

FOREIGN PATENT DOCUMENTS

WO    WO-2022087497 A1 *   4/2022   ........... G06F 40/284

OTHER PUBLICATIONS

U.S. Appl. No. 17/492,253 Office Action dated Aug. 25, 2022.
U.S. Appl. No. 17/492,253 Final Office Action dated Jan. 31, 2023.

*Primary Examiner* — Gregory S Cunningham, II
(74) *Attorney, Agent, or Firm* — Polsinelli LLP

(57) ABSTRACT

The present disclosure is directed method and apparatus that may automatically adjusting credits that offered to support a project based on received project information. Information received by a computer that evaluates credit adjustments may include a property value, a current amount of debt, a current value of project materials, type of project materials, a current credit amount, and an address associated with the product. Such methods may include using received client information to establish an account credit offer based on the received client information, establish a project credit offer based on reived project information, generate an adjustment multiple when the project credit offer is different than the account credit offer, and change the account credit offer based on the project credit offer and the adjustment multiple.

27 Claims, 9 Drawing Sheets

(56) References Cited

U.S. PATENT DOCUMENTS

| | | |
|---|---|---|
| 2018/0268506 A1* | 9/2018 | Wodetzki ............... G06N 5/046 |
| 2018/0293533 A1* | 10/2018 | Lowry .................... G06F 9/543 |
| 2020/0167861 A1 | 5/2020 | Ramaswamy et al. |
| 2020/0357057 A1 | 11/2020 | Gordon et al. |
| 2020/0410617 A1* | 12/2020 | Wichern ............. G06Q 30/0185 |
| 2021/0073694 A1* | 3/2021 | Yellin .................... G06Q 10/00 |
| 2021/0366065 A1* | 11/2021 | Zhou ....................... G06F 40/56 |
| 2022/0108391 A1 | 4/2022 | Doyle |

\* cited by examiner

AUTOMATED PROJECT ASSESSMENT AND ENHANCEMENT

CROSS-REFERENCE TO RELATED APPLICATIONS

The present patent application is a continuation-in-part of U.S. patent application Ser. No. 17/492,253 filed on Oct. 1, 2021, which claims the priority benefit of U.S. provisional patent application 63/086,253 filed on Oct. 1, 2020, the disclosures of which are incorporated by reference herein.

BACKGROUND OF THE INVENTION

1. Field of the Disclosure

The present disclosure is generally directed to systems and methods for project assessment. More specifically, this disclosure is directed to automated project assessment and enhancement.

2. Description of the Related Art

Construction and similar projects may involve a variety of different types of parties each having associated with different sets of data, including contractors, sub-contractors, suppliers, property owners, lenders, etc. Such a project may generally entail the various parties providing information regarding one or more associated contracts, each of which may include information that needs to be verified, validated, and assessed. Moreover, each of the different parties involved may maintain different subsets of the data in different forms and formats, and as a result, project management has generally been a highly-specific manual process by which human managers manually search for, collect, and review different documents. Such manual processes may be time-consuming and require trained personnel to perform.

In another example, conventional lending systems may assess individual borrower financing applications (e.g., assign a score) based on a predetermined set of factors. In such systems, a borrower may apply electronically through a lender website or another party website associated with the lender. Lending institutions (e.g., traditional banks, private and commercial money lenders) may assess the application based on credit reports (e.g., records provided by credit reporting agencies regarding credit standing of the prospective borrower) and/or credit scores (e.g., numeric score generated by a statistical model to objectively evaluate the prospective borrower's credit-worthiness). While the exact formula may differ by agency, such credit reports and credit scores may be based on factors including income, age of credit, outstanding debt, historical payment performances, and assets. In relying on such formulaic reports or scores, conventional lending systems may therefore result in a one-size-fits all type of assessment upon every application, which fails to take into account the totality of circumstances and other ways in which the application may be assessed. Such systems are therefore suboptimal due to the narrow focus on predetermined attributes and rigid formulas, as such inflexibility may exclude parties that may not receive a high score under one type of assessment but may receive a high score under a different type of assessment. There are presently no available systems for automated coordination and streamlining of such assessment for complex projects (particularly for unsecured subcontractor projects), let alone one that expands upon and considers expanded factors leading to identification of ways to supplement and improve assessments and that makes customized recommendations as to how to improve or enhance assessment results under the other type(s) of assessment.

Therefore, there is a need for an improved systems and methods for implementing automated project assessments and enhancements.

SUMMARY OF THE CLAIMED INVENTION

The present disclosure is directed to apparatus, methods, and non-transitory computer-readable media for automated project assessments and enhancements. In various embodiments of the present invention, an electronic file including text of a project contract may be received over a communication network. The text within the electronic file may be analyzed to identify one or more project parameters of different project parameter types indicated by the text. The identified project parameters may be verified and expanded upon by executing a search of one or more online data sources in accordance with the associated project parameter type indicated by the text of the electronic file. A project score may be assigned to the electronic file based on the expanded set of project parameters. In instance where the assigned project score is determined to fall below a predetermined threshold, one or more enhancements may be identified that are available for the project contract based on the identified project parameters. Each enhancement may be associated with an adjustment to the assigned project score. A recommendation may be generated regarding at least one of the identified enhancements associated with an adjusted project score that meets the predetermined threshold. The recommendation may thereafter be provided for display on a computing device associated with the project contract.

DETAILED DESCRIPTION

Figure 1:
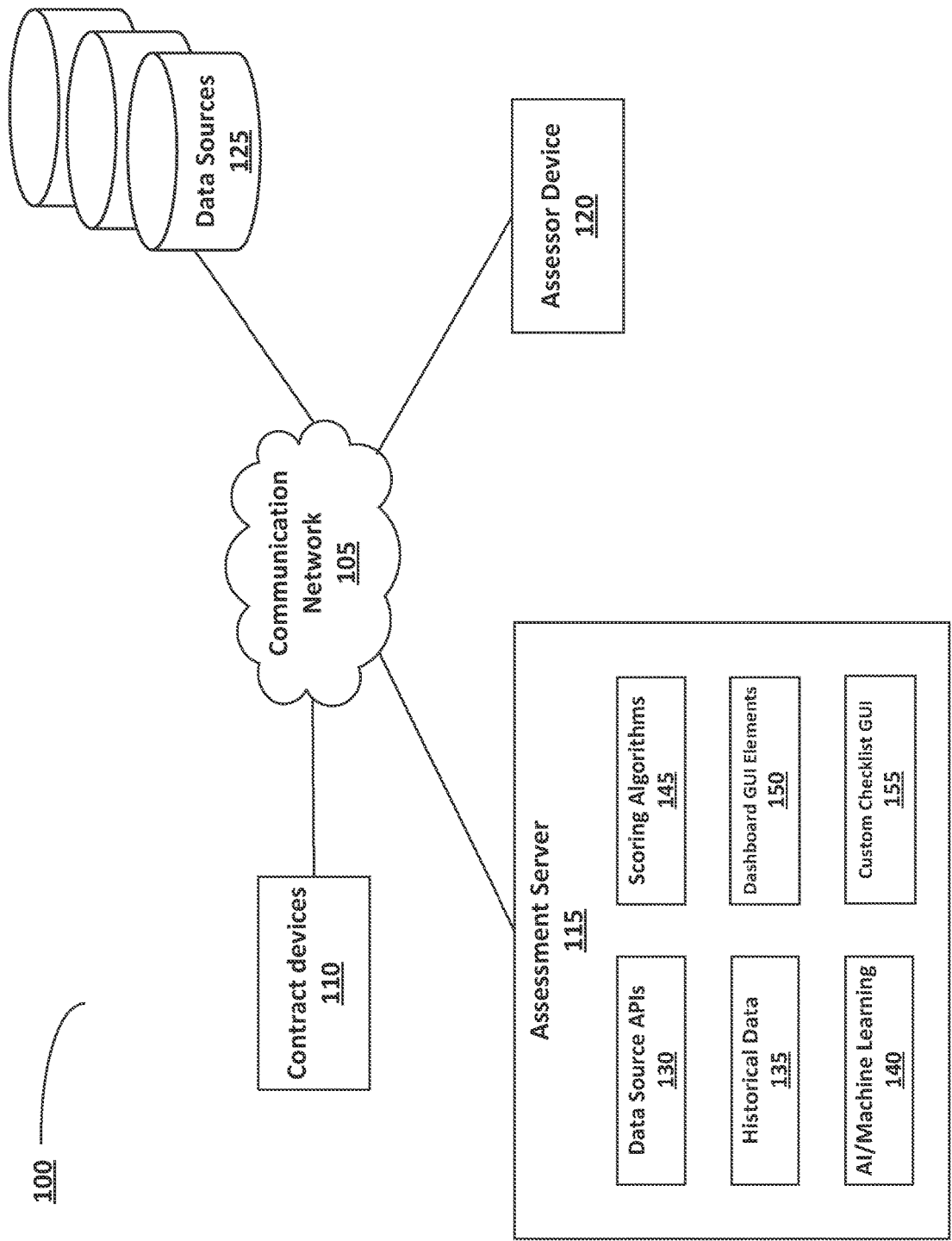
FIG. 1 illustrates an exemplary network environment in which a system for automated project assessment and enhancement may be implemented.

Embodiments of the present invention may include methods, systems, and non-transitory computer-readable media for automated project assessments and enhancements. In various embodiments of the present invention, an electronic file including text of a project contract may be received over a communication network. The text within the electronic file may be analyzed to identify one or more project parameters of different project parameter types indicated by the text. The identified project parameters may be verified and expanded upon by executing a search of one or more online data sources in accordance with the associated project parameter type indicated by the text of the electronic file. A project score may be assigned to the electronic file based on the verified and expanded set of project parameters. In instance where the assigned project score is determined to fall below a predetermined threshold, one or more enhancements may be identified that are available for the project contract based on the identified project parameters. Each enhancement may be associated with an adjustment to the assigned project score. A recommendation may be generated regarding at least one of the identified enhancements associated with an adjusted project score that meets the predetermined threshold. The recommendation may thereafter be provided for display on a computing device associated with the project contract.

The present disclosure is directed to methods, systems, apparatuses, and computer-readable storage media for automatically generating and adjusting project assessment scores based on received project information and related actions. Information received by a computer that evaluates project adjustments may include any kind of data related to a project. For example, data relating to construction projects may include a property value, a current amount of debt, a current value of project materials, a current credit amount, and an address associated with the product. Such methods may include using received client information to establish an account credit offer based on the received client information, establish a project credit offer based on reived project information, generate an adjustment multiple when the project credit offer is different than the account credit offer, and change the account credit offer based on the project credit offer and the adjustment multiple.

In some instances, a project may involve utilizing property criteria to adjust a credit offer or other contract by establishing an account credit offer based on client information, establishing a project credit offer based on project information. This project information may include a project address. Determining how to enhance such a project may include generating an adjustment multiple when the project credit offer is different than the account credit offer and increasing the account credit offer based on the project credit offer and the adjustment multiple. For example, for contractor Alex, with tax ID—779, DOB—Apr. 5, 1789, credit score—826, credit required $900,000, and a commercial property at 31 King Street, Chicago, with project materials to be installed for $1,000,000 and based on the credit requirement of $900,000 and property material evaluation of $1,000,000, an additional credit offer adjustment of $100,000 is made.

The project address may include the address for which assets purchased by the credit will be installed in one embodiment. Here, the assets may include building materials. For example, for Alex, the project address is a commercial property at 31 King Street, Chicago, with project materials to be installed for $1,000,000. Information associated with the project may include a set of property attributes. In one embodiment, these property attributes may include one or more of property value, property type, property use, schedule of improvements, and eligibility for adjustments. For example, for Alex, the property type is commercial. A project credit offer may be based on a summation of a plurality of projects. For example, for Alex, the summation of a plurality of projects is $10,000,000. Methods consistent with the present disclosure may include the steps of recalculating the project credit offer based on the addition of a new project. For example, for Alex, with a new project of $500,000, the project credit is recalculated to $10,500,000 by adding the new project cost of $500,000 to the original $10,000,000.

Establishing an account credit offer may be based on contractor inputting information. For example, for Alex, the account credit offer is made at $900,000. The information input by the contractor may include one or more of a tax ID number, business owner information, date of birth, a credit report, a business report, and an address. For example, for Alex, with tax ID—779, DOB—Apr. 5, 1789, credit score—826, credit required $900,000, and commercial property at 31 King Street, Chicago, with project materials to be installed for $1,000,000. Establishing an account credit offer may be based on an evaluation of the contractor inputting information exceeding a pre-set minimum threshold. For example, for Alex, based on the credit requirement of $900,000 and property material evaluation of $1,000,000, an additional credit offer adjustment of $100,000 is made. For example, a credit offer would mean a first party would offer to pay for materials to a second party for payments overtime plus finance charges.

In certain projects, for example, contractor input information is provided by a device associated with the contractor. The contractor may apply for credit by inputting a predefined set of information. The input provided by the contractor may be received in a request for assessment and enhancement. Further, the predefined set of information may include, but may not be limited to, tax identification (ID) number, business owner information, date of birth (DOB), credit required, credit report, credit score, financing rate, term, business report, and project address—place neighborhood, parcel, and comparable properties. For example, for contractor Alex, with tax ID—779, DOB—Apr. 5, 1789, credit score—826, credit required $900,000, and commercial property at 31 King Street, Chicago, with project materials to be installed for $1,000,000. Further, the contractor input may correspond to project information and might include property attributes like property type, property use, schedule of improvements, and eligibility for adjustments.

The project may further undergo analysis, including inter alia credit underwriting based on the input information. It can be noted that the underwriting process may be the process by which the lender decides whether the contractor (a user or an applicant) is creditworthy and should receive project approval. Further, the credit underwriting process may be performed by the assessment server or by third-party services connected to a communication network. For example, Mark's credit underwriting process is performed for Alex for the credit requirement of $900,000. The analysis may determine if the account credit offer is above a minimum threshold. In one case, if the account credit offer is not above the minimum threshold, then the account may be rejected. For example, if Alex does not provide a valid tax ID, Alex's account may be rejected. In another case, if the account credit offer is above the minimum threshold, then the account credit offer may be established. Finally, when the account credit offer is above the minimum threshold the account may be approved. For example, for Alex, the minimum threshold requirement of a tax ID and credit score and a minimum credit ask value of $500,000 is met, then the account credit offer is approved.

Project analysis may further include a project underwriting process. A project underwriting process may be related to the property associated with the contractor. It can be noted that the project underwriting process may be the process that involves inputs, including the address for which the assets will remain and the property value of the address. For example, for Alex project underwriting process is performed by Mark, for Alex for the credit requirement of $900,000 and property material evaluation of $1,000,000 of Alex's property at 31 King Street, Chicago. Here, assets may be but may not be limited to building materials, and the address may be a building site where the materials will be installed. Further, the project credit offer may be tied to the building site address and property value of that address. The property attributes considered may include one or more of property value, property type (e.g., commercial including office space, retail, industrial, etc.), property use, schedule of improvements, government vs. private, and eligibility for adjustments. The project credit offers determinations are also project-specific and cumulative, so as new projects under the account come in, new credit decisions are calculated for the account.

Further, the project analysis may further include determining if a project credit offer is above a minimum threshold. For example, for Alex, with credit required for $900,000 and property with property material evaluation of $1,000,000, it may be determined if the project credit offer is above the minimum threshold. In one embodiment, the lender may determine that the contractor or borrower may have suboptimal credit. In one case, if the project credit offer is not above the minimum threshold, then the account may be rejected. For example, for Alex, when the credit required is $1,200,000, which is more than the property evaluation value, then Alex's account may be rejected. In another case, when the project credit offer is above the minimum threshold, then the project credit offer may be established. For example, for Alex, if the credit required is $900,000, which is less than the property evaluation value, then Alex's account is approved, and a project credit offer is established.

Based on the established project credit offer and the established account credit offer, a credit offer adjustment may be performed. For example, for Alex, based on the credit requirement of $900,000 and property material evaluation of $1,000,000, an additional credit offer adjustment of $100,000 is made. It can be noted that the system may recalculate the project credit offer based on the addition of a new project. For example, for Alex, with a new project of $500,000, the project credit is recalculated to $1,500,000.

In other implementation, the request for assessing and enhancing an account credit offer may be received. For example, for contractor Alex, with tax ID—779, DOB—Apr. 5, 1789, credit score—826, the account credit offer received is $900,000. Further, the project account offer may be received. For example, for contractor Alex, with tax ID—779, DOB—Apr. 5, 1789, credit score—826, a commercial property at 31 King Street, Chicago, with a project account offer of $1,000,000.

Further, it may be determined if the project credit offer is more than the account credit offer. In one case, if the project credit offer is not more than the account credit offer, then the account credit offer may be set to the project credit offer. For example, for a project credit offer of $700,000, then count credit offer of $900,000 is also set to $700,000. In another case, if the project credit offer is more than the account credit offer, then the credit offer adjustment may be applied. For example, for contractor Alex, with tax ID—779, DOB—Apr. 5, 1789, credit score—826, a commercial property at 31 King Street, Chicago, with account credit offer received is $900,000 and the project account offer of $1,000,000, the account credit offer is set to $1,000,000, with an adjustment multiple of $100,000. Here, the adjustment multiple may be based on a percentage of the value of new projects that come in. For example, if a summation of the project credit offer is different than the account credit offer, then the contractor may receive an adjustment. In other instances, the adjusted credit may be offered based on the ability of the client to attract more valuable projects. Further, a part of the property research and attributes evaluated may be used as a criterion for credit adjustment eligibility.

The system and method for utilizing a lien to implement an adjustment may also include standard reporting mechanisms, such as generating a printable receipt of the transaction or electronic results report that can be transmitted to any communicatively connected computing device, such as a generated email message or file attachment. Likewise, particular results of the system transaction can trigger an alert signal, such as the generation of an alert email, text, or phone call, to alert a user, financial institution, or person associated with the user or financial institution.

The subject disclosure describes a method for utilizing project information to adjust the credit offer, which may include executing one or more algorithms for implementing an adjustment to a financial instrument. The algorithms can include one or more local or remote executable software platforms, mobile device platforms, or a hosted Internet or network program or portal. In one embodiment, only portions of the system are computer operated, and in other embodiments, the entire system is computer operated. In one embodiment, client users may run an application on their mobile devices so that project data can be easily accessed in real-time. The system and method for utilizing a mechanic's lien for implementing an adjustment is fully integrated for use with any additional platform and data output that may be used to communicate with other platforms, such for example, financial institution platforms, user information platforms, cyber security platforms, and payment collection platforms.

At first, the account credit offer may be received. For example, for contractor Alex, with tax ID—779, DOB—Apr. 5, 1789, credit score—826, the account credit offer received is $900,000. Further, the project account offer may be received. For example, for contractor Alex, with tax id—779, DOB—Apr. 5, 1789, credit score—826, a commercial property at 31 King Street, Chicago, with a project account offer of $1,000,000.

Further, it may be determined if the project credit offer is more than the account credit offer. In one case, if the project credit offer is not more than the account credit offer, then the account credit offer may be set to the project credit offer. For example, for a project credit offer of $700,000, then count credit offer of $900,000 is also set to $700,000. In another case, if the project credit offer is more than the account credit offer, then the credit offer adjustment may be applied. For example, for contractor Alex, with tax id—779, DOB—Apr. 5, 1789, credit score—826, a commercial property at 31 King Street, Chicago, with account credit offer received is $900,000 and the project account offer of $1,000,000, the account credit offer is set to $1,000,000, with an adjustment multiple of $100,000. Here, the adjustment multiple may be based on a percentage of the value of new projects that come in. For example, if a summation of the project credit offer is different than the account credit offer, then the contractor may receive an adjustment. In other instances, the adjusted credit may be offered based on the ability of the client to attract more valuable projects. Further, a part of the property research and attributes evaluated may be used as a criterion for credit adjustment eligibility.

The system and method for utilizing a lien to implement an adjustment may also include standard reporting mechanisms, such as generating a printable receipt of the transaction or electronic results report that can be transmitted to any communicatively connected computing device, such as a generated email message or file attachment. Likewise, particular results of the system transaction can trigger an alert signal, such as the generation of an alert email, text, or phone call, to alert a user, financial institution, or person associated with the user or financial institution.

FIG. 1 illustrates an exemplary network environment 100 in which a system for automated project assessment and enhancement may be implemented. Network environment 100 may include one or more computing devices 110-125 in communication with each other over a communication network 105. The devices may include contract devices 110, assessment server 115, assessor device 120, and data sources 125.

The communication network 105 may be implemented for connecting the various devices in the network environment 100. Further, the communication network 105 may be coupled to one or more computing devices 110-125. Further, the communication network 105 may be a wired or a wireless network. If wireless, communication network 105 may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques, known in the art. The communication network 105 may allow ubiquitous access to shared pools of configurable resources and higher-level services that can be rapidly provisioned with minimal management effort, often over the internet, and relies on sharing of resources to achieve coherence and economies of scale, like a public utility, while third-party clouds enable organizations to focus on their core businesses instead of expending resources on computer infrastructure and maintenance. The communication network 105 may also use standard architecture and protocols as understood by those skilled in the art, such as, for example, a packet-switched network for transporting information and packets in accordance with a standard transmission control protocol/Internet protocol ("TCP/IP"). Additionally, the computing devices 110-125 may utilize any conventional operating platform or combination of platforms (Windows, Mac OS, Unix, Linux, Android, etc.) and may utilize any conventional networking and communications software as would be understood by those skilled in the art. Additionally, the communication network 105 may be communicatively coupled to and support communication exchanged among the one or more computing devices 110-125.

Finally, the communication network 105 of FIG. 1 may be a wide area network and may be any suitable networked system understood by those having ordinary skill in the art, such as, for example, an open, wide area network (e.g., the Internet), an electronic network, an optical network, a wireless network, a physically secure network or virtual private network, and any combinations thereof. The communication network 105 may also include any intermediate nodes, such as gateways, routers, bridges, Internet service provider networks, public-switched telephone networks, proxy servers, firewalls, and the like, such that the communications network may be suitable for the transmission of information items and other data throughout the network environment 100.

Further, to protect data of the borrower, such as sensitive user financial and personal identification data, government data related to the construction or site plans, other confidential data, and to comply with state and federal laws pertaining to the protection of financial and personal identification data, an encryption standard may be used to protect files from unauthorized interception over the network. Any encryption standard or authentication method as may be understood by those having ordinary skill in the art may be used at any point in the system of the present invention. For example, encryption may be accomplished by encrypting an output file using a Secure Socket Layer (SSL) with dual key encryption. Additionally, the system may limit data manipulation or information access. For example, a system administrator may allow for administration of the system at one or more levels, such as at an individual reviewer, a review team manager, a quality control review manager, or a system manager. Further, the system administrator may also implement access or use restrictions for users at any level. Such restrictions may include, for example, the assignment of usernames and passwords required for the use of the system runs a check for or to implement an adjustment, backend administrative access, associated mobile device apps, or the selection of one or more data types that the subservient user is allowed to view or manipulate.

In one embodiment, the system software may also be a portal or software as a service (SaaS) that provides, via the GUI, remote access to and from the system for implementing an adjustment. The software may include, for example, a network browser as well as other standard applications. The software may also include the ability, either automatically based upon a user request in another application or by a user request, to search or otherwise retrieve data from one or more remote points, such as on the Internet or from a limited or restricted database. The software may vary by user type or may be available to only a certain user type, depending on the needs and configuration of the system devices of FIG. 1. Users may have some portions, or all the application software reside on a local computing device or may have linking mechanisms, as understood by those skilled in the art, to link a computing device to the software running on a central server via the communications network, for example. As such, any device having or having access to; the software may be capable of uploading or downloading any information item or data collection item, or informational files associated with such files.

Further, the presentation of data through the software may be in any sort and number of selectable formats. For example, a multi-layer format may be used, wherein the additional information is available by viewing successively lower layers of presented information. Such layers may be made available by using drop-down menus, tabbed folder files, or other layering techniques understood by those skilled in the art or through a novel natural language interface as described herein throughout.

The computing devices 110-125 may include any type of a computing device known in the art, including a desktop computer, laptop, smartphone, tablet, computer, smart speaker, smartphones, other wireless digital/cellular devices, or I/O devices. It can be noted that the computing devices 110-125 may be explained in further detail in relation to FIG. 5. The computing devices 110-125 may include at least one processor, I/O interface, and all hardware and software typically found on computing devices to store data and run programs and send and receive data over the communication network 105, if needed. In one embodiment, when a central processing server is used, it may be one server or, more preferably, a combination of scalable servers, providing functionality as a network mainframe server, a web server, a mail server, and central database server, all maintained and managed by an administrator or operator of the computing devices 110-125 of FIG. 1. The computing devices 110-125 may also be connected directly or via the communication network 105 of FIG. 1 to remote databases (e.g., data sources 125), such as for additional storage backup, and to allow for the communication of files, email, software, and any other data formats between two or more computing devices, such as between a mobile user device, client systems, lender systems, and financial institution platforms. Further, the network environment 100 of FIG. 1 may utilize multiple numbers and various databases without departing from the scope of the disclosure.

Figure 5:
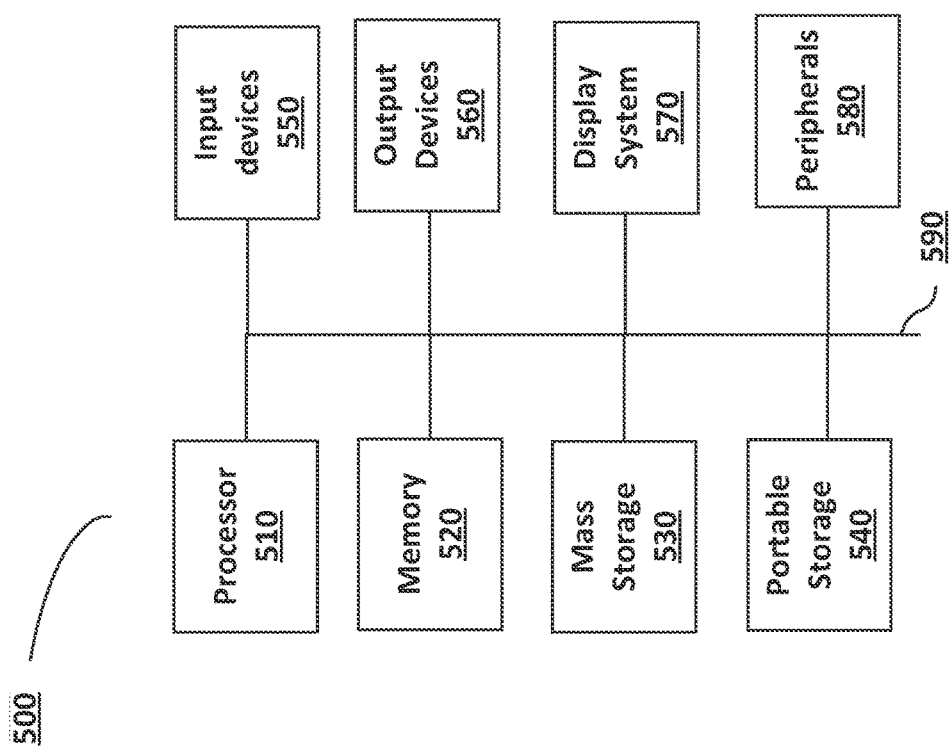
FIG. 5 is a block diagram of an exemplary computing device that may be used to implement an embodiment of the present invention.

Contract devices 110 may be any computing device, including that illustrated and described in relation to FIG. 5, that is associated with users and entities providing one or more electronic files (e.g., storing one or more contract documents and related documents) for assessment and enhancement. In exemplary embodiments, the electronic files may include text of a contract related to a project involving one or more other entities. In exemplary embodiments, the contract device 110 may submit the electronic files by transmission, linking, via a portal, or other electronic communication via communication network 105 to assessment server 115.

Assessment server 115 may include any data server known in the art that is capable of communicating and dynamically processing electronic files over communication networks, as well as generating and customizing graphic user interfaces. As illustrated, assessment server 115 may be configured to execute and operate in accordance with data source application programming interfaces (APIs) 130, historical data 135, AI/machine learning 140, scoring algorithms 145, dashboard GUI elements 150, and custom checklist GUI 155.

Data source APIs 130 allow for assessment server 115 to communicate with and process data from the various types of other computing devices of FIG. 1, including contract devices 110, assessor devices 120, and data sources 125 (e.g., such as content servers, web servers, cloud servers, remote or cloud databases). Data source APIs 130 may be specific to the particular computer programming language, operating system, protocols, etc., of the contract devices 110, assessor devices 120, and data sources 125. In a network environment 100 that includes multiple different types of contract devices 110, assessor devices 120, and data sources 125, there may likewise be a corresponding number of APIs 130. In exemplary embodiments, APIs 130 may allow assessment server 115 to efficiently retrieve, identify/categorize, and extract specific types of data sent electronically over communication network 105 from a variety of different types of the other computing devices for use in the assessment and enhancement operations described in further detail herein.

Historical data 135 may be inclusive of any type of data storage device used to store and manage historical data 135. In exemplary embodiments, historical data 135 may include data regarding historical projects (e.g., past approved and/or completed projects), including data regarding related project assessments and enhancements. Historical data 135 may be stored in similar fashion and/or in association with data regarding current and ongoing projects. Project data may include data regarding the various entities involved in a project, various parameters and components of the project, associated project score(s), and metrics regarding approvals/disapprovals or successful/unsuccessful completion of the project. The historical data 135 may continue to be updated on an ongoing basis as new projects are created and completed.

Operating in conjunction with the historical data 135, AI/machine learning 140 may be used to identify patterns and trends associated with approved and/or successful projects, as well as patterns and trends associated with disapproved and/or unsuccessful projects. For example, AI/machine learning 140 may identify that approved and/or successful projects are associated with project scores above a certain threshold level and that such project scores are associated with certain project parameters (and measurements thereof). Metadata regarding project-related communications, interactions, and online operations may also be included in and stored as historical data 135. Based on such historical data 135, AI/machine learning 140 may assess historical projects in accordance with one or more scoring algorithms to identify a recommended threshold above which the projects tend to be associated with indicators of approvals and/or success.

AI/machine learning 140 may also be applied to current projects to select one or more appropriate scoring algorithms 145 and predict whether a given current project is likely to be (or should be) approved and/or successful in comparison to similar or comparable historical projects. In addition, AI/machine learning 140 may further be used to identify recommended ways (e.g., in accordance with the same or different scoring algorithms 145) in which a current project may be modified to improves its odds of approval and/or success. Such recommendations may entail additional information be provided or actions be taken, which may be associated with changes to one or more project scores in accordance with one or more scoring algorithms 145.

Scoring algorithms 145 may include any available scoring algorithm for assessing a project based on its parameters. Each scoring algorithm may include a subset of identified project parameters, a weight assigned to each project parameter in the subset, and a rule for determining how the weighted project parameter in the subset are to be combined and considered (e.g., relative to a threshold). Different scoring algorithms 145 may be used to assess different combinations of project parameters, which may differ in value, availability, and applicability from project to project. Depending on the currently available project parameter data therefore, assessment server 115 may filter and identify a subset of scoring algorithms 145 to apply to a particular project. Using AI/machine learning 140, assessment server 115 may further identify an additional or overlapping subset of scoring algorithms 145 that may result in a different (e.g., higher) score contingent upon additional information being provided (and/or additional actions being taken). For example, assessment server 115 may analyze data associated with a particular project in accordance with available project parameters and a selected scoring algorithm to generate a score that falls beneath an associated threshold.

In exemplary embodiments, AI/machine learning 140 may further refine or change existing scoring algorithms in accordance with the continually evolving body of historical data 135. For example, new types of projects may arise involving new types of project parameters, where the approval or success may not be accurately predicted in accordance with existing scoring algorithms. Similarly, even traditional projects may have different success outcomes based on changing conditions (which may or may not already be considered by the project parameters of existing scoring algorithms). AI/machine learning 140 may therefore also be applied to historical data 135 to identify modifications to existing algorithms or new algorithms (e.g., different subset of project parameters, different assigned weights) that may more accurately predict outcomes of similar projects.

Dashboard GUI elements 150 and custom checklist GUI elements 155 provide a variety of available graphic user interface elements used to present subsets of project data to a requesting user (e.g., associated with assessor device 120). Dashboard GUI elements 150 and custom checklist GUI elements 155 may include a variety of different templates or formats in which a dashboard, overlay, or menu may be used to present data and options related to ongoing or completed analyses. As described herein, project assessment may include analyzing one or more electronic files relating to one or more project documents to identify a set of project parameters. The project parameters may be verified and/or supplemented by querying data sources 125 using data source APIs 130, which may provide responsive data (as well as updates to such data) upon request and/or on a continual basis. Such data may be used by assessment server 115 to calculate one or more project scores in accordance with one or more of the scoring algorithms 145. Assessment server 115 may further execute AI/machine learning 140 in conjunction with historical data 135 to generate recommendations on how to improve project scores under the same or different scoring algorithms 145. All the data arising from the queries and analyses may be combined, analyzed, and summarized using dashboard GUI elements 150 and custom checklist GUI elements 155 within a custom display that has been filtered to present only the most relevant data to the end-user (e.g., of assessor device 120).

For example, an exemplary dashboard may be generated from a selected subset of the dashboard GUI elements 150 to present a summary display (e.g., latest status of project parameters, related score(s), and recommendations on how to enhance either or both of the project parameters and related scores). The dashboard may also include a set of links to original document data (e.g., from electronic files provided by contract device 110 and stored locally by assessment server 115 or remotely at data sources), to verification data and expanded/supplemental data (e.g., provided by data sources 125), detailed data regarding the specific project parameters and scoring algorithms 155 used to determined one or more scores for the current project, detailed data regarding historical projects having similarities used to generate the recommendation(s), etc., made available for immediate access from within a single, consolidated dashboard display. The dashboard display therefore allows the user (e.g., of assessor device 120) to directly access project data from multiple different sources more efficiently (e.g., avoiding the need to manually navigate to each data source, search each data source for relevant data, or manually initiate analytical functions) by identifying relevant types of data, automatically generating links to where the identified data is stored, and providing the links within a summary display for direct access. The user of assessor device 120 may therefore have immediate access to the relevant data without having to look up, access each of the different data sources, or navigate across different associated websites, webpages, or web application screens. Moreover, the custom dashboard and/or custom checklists may be continually updated (e.g., in real-time) to reflect current project parameters, associated current conditions, and resulting scores and enhancement recommendations.

In addition, the custom dashboard display may also be associated with custom checklists, which may be embedded within the dashboard display or provided as an overlay. As with the custom dashboard display, the custom checklist may include a combination of a subset of custom checklist GUI elements 155 used to represent a subset of available enhancement actions that may be identified by the generated recommendations for enhancing a project score. Each enhancement action may be associated with a link selectable to initiate an automated workflow window (e.g., within the same or different overlay) associated with the given enhancement action. The workflow window may include any combination of instructions, further hyperlinks, forms, and other content that facilitates data transmission of enhancement data and/or performance of an enhancement action. For example, if additional or supplemental data need be provided from one or more financial institutions, links to websites or portals associated with the financial institution may be provided for selection whereupon any applicable APIs may be used to automate the retrieval of the supplemental data. When the supplemental data is received by assessment server 115, the custom dashboard and/or custom checklist may be automatically updated to reflect completion of the enhancement action and any modification or update to the project score(s) as a result.

Data sources 125 may be inclusive of local and remote (e.g., online, web-based) storage devices and databases that store data related to the project, including data regarding one or more entities (e.g., borrowers, lenders), related credit histories, current credit rating(s), project components and subcomponents, propert(ies) involved, associated values and measurements relating to the overall project or components/subcomponents thereof, etc. Further, the data sources 125 may be configured to store a systematic collection of data used for electronic storage and data manipulation. In one embodiment, data sources 125 may include various types, such as but not limited to a centralized database, cloud database, and network database. The data sources 125 may include structured data containing details of the users, including the lender or the borrower, and all other documents related to their agreement. In an embodiment, the data sources 125 may include the name and address of the lender and borrower, agreement terms and conditions between the lender and the borrower. For example, an address could mean a place, a neighborhood, a parcel of land, or other comparable properties, etc. There are no limitations to the number, type, or connectivity of the data sources 125 utilized by the system devices of FIG. 1.

Assessor devices 120 may be any computing device, including that illustrated and described in relation to FIG. 5, that is associated with users and entities requesting assessment and enhancement for a project. Such users and entities may be the same, overlap with, or may be different from the users and entities associated with the contract devices 110. Assessor devices 120 may be used to access the assessment and enhancement data regarding a project. Such data may be provided via a customized dashboard and/or customized checklist, each of which may present one or more project scores and one or more recommendations for enhancing the project scores in accordance with one or more enhancement actions. In addition to providing a visual presentation of a filtered, analyzed, and consolidated set of project data and associated analytical results (e.g., scores, recommendations, linked supporting data), the customized dashboard and/or customized checklist may further facilitate and streamline performance of the enhancement action by providing automated workflows in response to user selection of the recommended enhancement action. Verification data related to completion of the enhancement action(s) may further be automatically provided to assessment server 115 without requiring further action from the user of assessor device 120. Such verification data may be used to update the customized dashboard and/or customized checklist to reflect current (e.g., real-time) status in relation to project score(s) and any further recommendations. Similarly, expanded or supplemental data may also be provided within the dashboard, which may further include one or more links to the specific source that provided the expanded or supplemental data.

Figure 2:
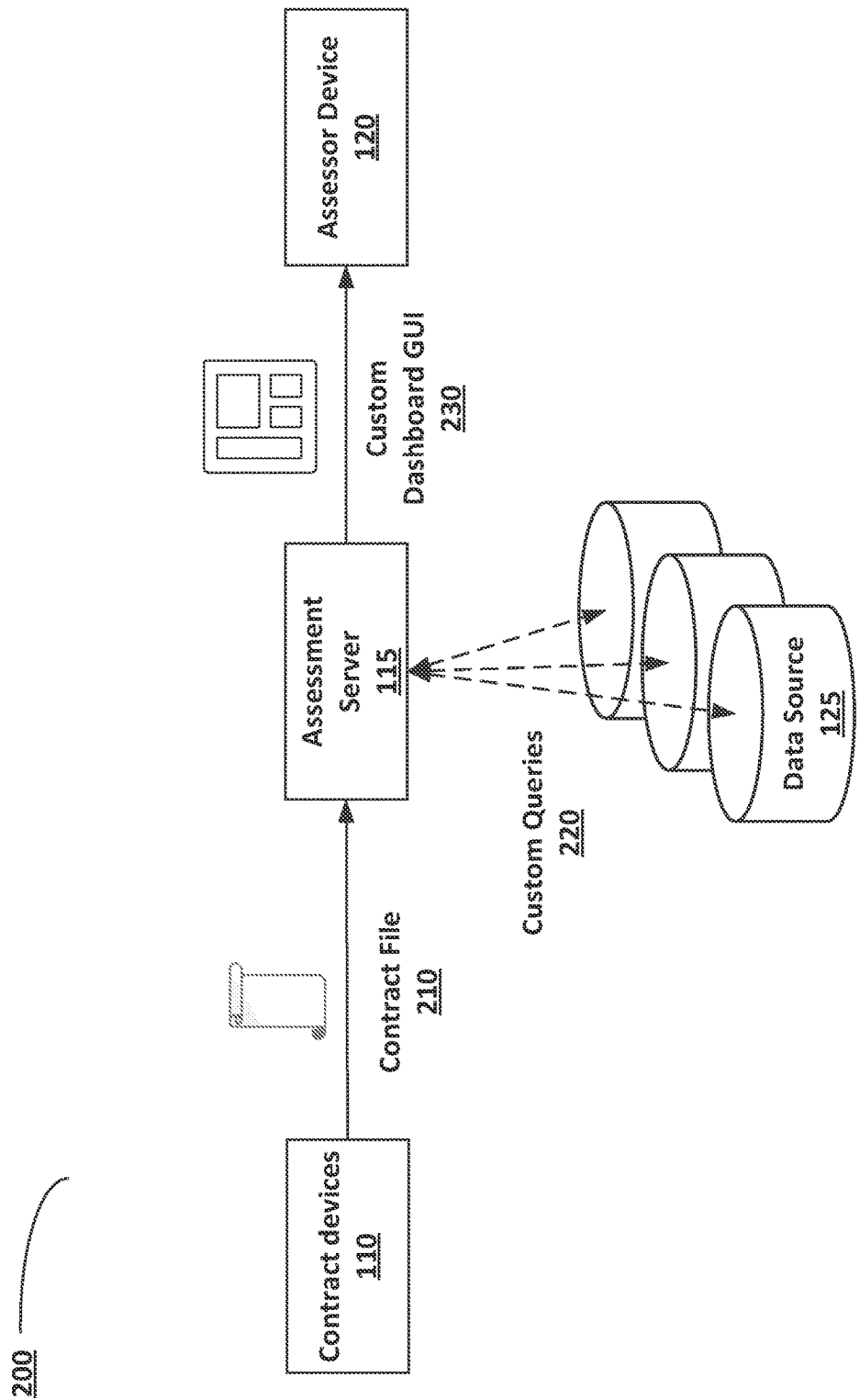
FIG. 2 is a diagram illustrating exemplary data exchanges within a system for automated project assessment and enhancement.

FIG. 2 is a diagram illustrating exemplary data exchanges within a system for automated project assessment and enhancement. As illustrated, contract devices 110 may provide one or more contract files 210 to assessment server 115, which may analyze the files to identify project parameter types. Based on the identified project parameter types, the assessment server 115 may automatically formulate custom queries 220 to data sources 125 (e.g., using data source APIs 130) to trigger generation of verification data and expansion/supplementation of the dataset as to the same. The assessment server 115 may thereafter retrieve the responsive verification and supplemental data from the data sources 125, which may be used to perform one or more analyses in accordance with a subset of scoring algorithms and to generate recommendations regarding project score enhancement based on application of AI/machine learning 140 to historical data 135 and data associated with the project being assessed. Assessment server 115 may further generate and provide a custom dashboard graphic user interface 230 to assessor device 120.

Figure 3:
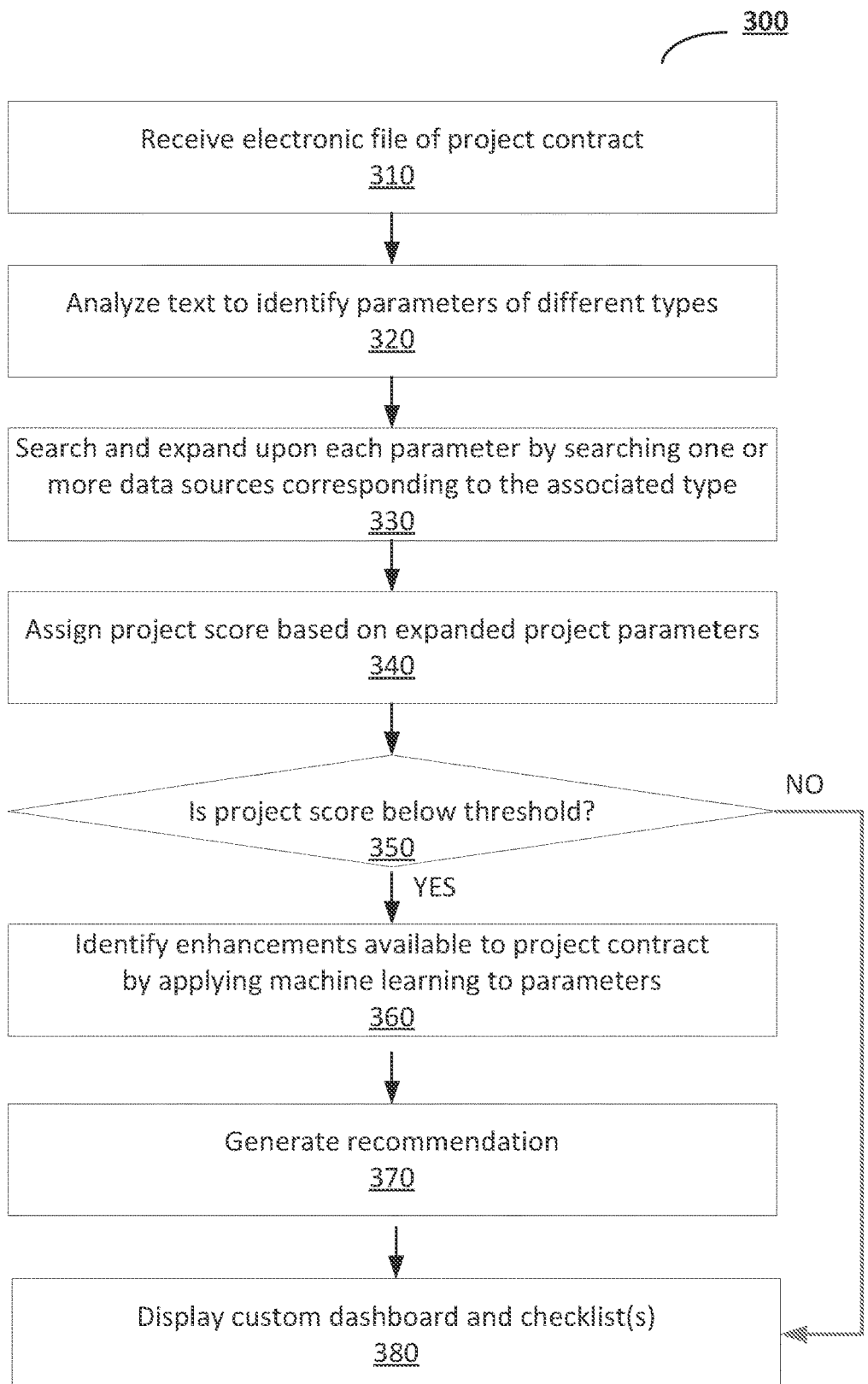
FIG. 3 is a flowchart illustrating an exemplary method for automated project assessment and enhancement.

FIG. 3 is a flowchart illustrating an exemplary method 300 for automated project assessment and enhancement. It should also be noted that in some alternative implementations, the functions noted in the blocks may occur out of order noted in the drawings. For example, two blocks are shown in succession in FIG. 3 may be executed substantially concurrently, or the blocks may sometimes be executed in the reverse order, depending upon the functionality involved. In addition, the process descriptions or blocks in flowcharts should be understood as representing decisions made by a hardware structure such as a state machine.

In step 310, one or more electronic files 210 may be provided from a contract device 110 via communication network 105 to assessment server 115. The electronic files 210 may include the content (e.g., text) of a project contract, which assessment server 115 may analyze to identify project parameters of different types in step 320. Based on the identified types of project parameters, assessment server 115 may identify a set of the data sources 125 that may be queried to verify the identified project parameters. Assessment server 115 may (using data source APIs 130) to generate custom queries to the identified set of data sources 125. Different data sources 125 may receive different custom queries regarding different verification data in accordance with the identified project parameters. The custom queries may overlap in terms of being directed to the same project parameter types or may be directed at different project parameter types. The custom queries may further be configured to expand upon the set of parameter data by obtaining more (previously unknown) details regarding known parameters. Additional custom queries may be generated and used to obtain additional parameter data until no new parameter data is returned within a set period of time.

In step 330, the expanded parameter data may be received by assessment server 115 in response to the custom queries, and in step 340, the assessment server 115 may generate and assign one or more project scores based on the verified and expanded project parameters in accordance with one or more scoring algorithms 145. The specific set of scoring algorithms 145 used by assessment server 115 to generate and assign the project score(s) may be selected from among a plurality of different available scoring algorithms 145. The selection of the specific set of scoring algorithms 145 may be based on historical data 135 from past projects having similar or the same project parameters.

In step 350, it may be determined as to whether the project score(s) may fall below a threshold. If not, the method 300 may proceed to step 380. If the score does fall below the threshold, however, the method may proceed to step 360 in which available enhancements predicted to improve the project score may be identified. Assessment server 115 may predict what enhancements may improve the project score by applying the AI/machine learning 140 to historical data 135 associated with past projects to identify which other scoring algorithms 145 (or modifications thereto) may be applicable to the verified and expanded project parameters to generate one or more higher project score(s). The additional scoring algorithms 145 may further require different or additional project parameters, however, or other enhancement action in order to generate the predicted higher score(s).

In step 370, one or more recommendations may be generated based on the additional scoring algorithm(s) and related enhancements identified as being likely to result in an improved project score that at least meets if not surpasses the threshold. In accordance with at least one of the additional scoring algorithm, therefore, a recommendation may include one or more enhancement actions. In addition, the generated recommendation may further include a set of links and workflow automations for executing one or more of the enhancement actions.

In step 380, a custom dashboard GUI 230 (and/or custom checklists) may be generated for a user of assessor device 120 upon request. Based on the identity of the user or associated entity, the assessment server 115 may generate the custom dashboard GUI 230 based on a selected set of dashboard GUI elements 150 and populate the same based on the data received (e.g., from electronic file), retrieved (e.g., verification or supplemental data), or generated (e.g., project score, identified enhancements) in the previous steps 310-370. The specific dashboard GUI elements 150 and populating data may be based on real-time status and data received by assessment server 115. Where a project score associated with a project requested by the assessor device 120 is determined to fall below a threshold, a custom checklist may further be generated with one or more recommendations each including one or more enhancement actions predicted to result in improvements to the project score. Each recommendation may be displayed within the custom checklist and selectable by the assessor device 120 to initiate an automated workflow that executes the associated enhancement action(s). The assessor device 120 may select one or more of the recommendations to apply to the specified project, and when the enhancement actions are confirmed as complete, the associated project score(s) may be automatically and dynamically updated to reflect any resulting improvement and whether such improvement allows the updated project score(s) to meet or surpass the threshold.

Figure 4A:
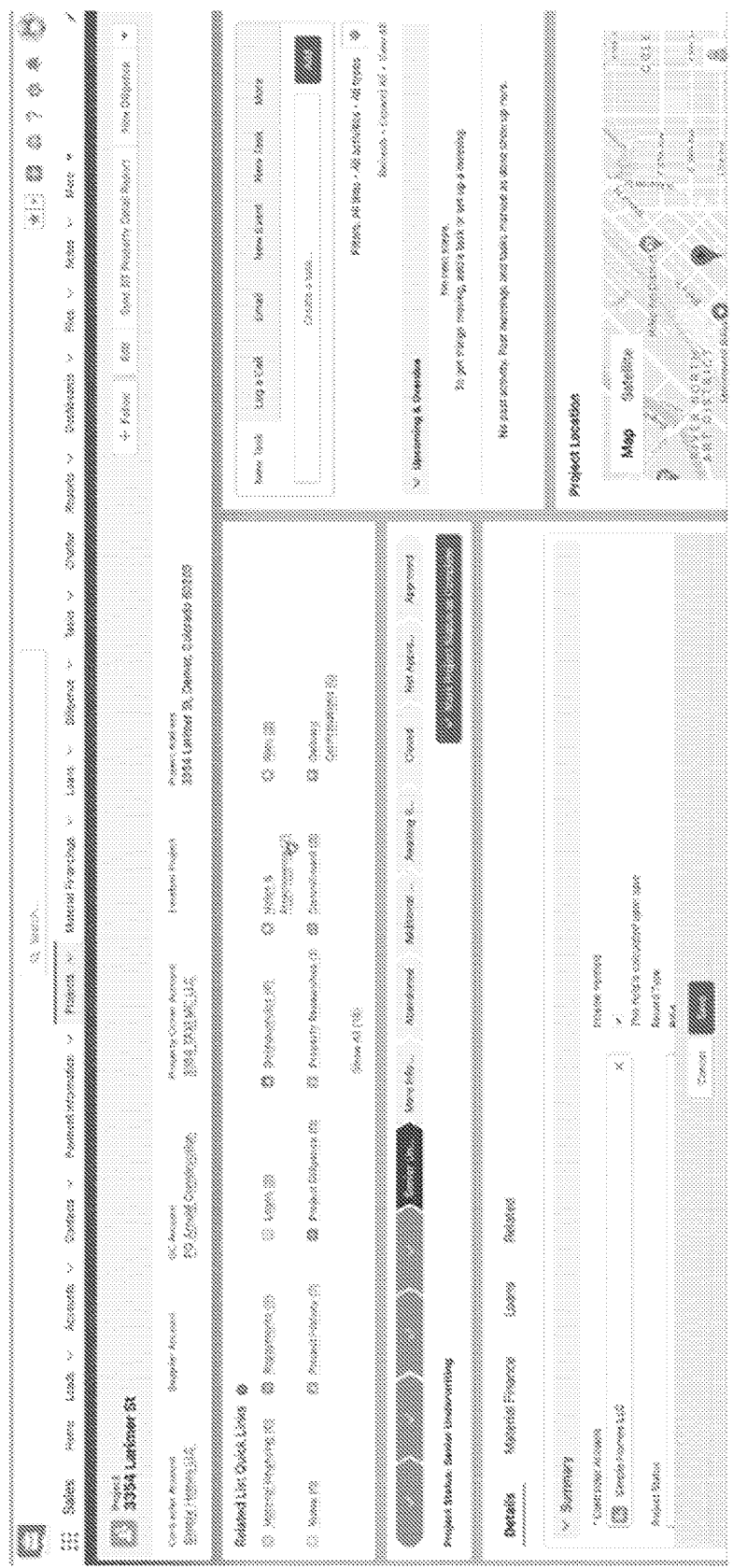
FIGS. 4A-E illustrates exemplary graphic user interfaces that may be generated by a system for automated project assessment and enhancement.
Figure 4B:
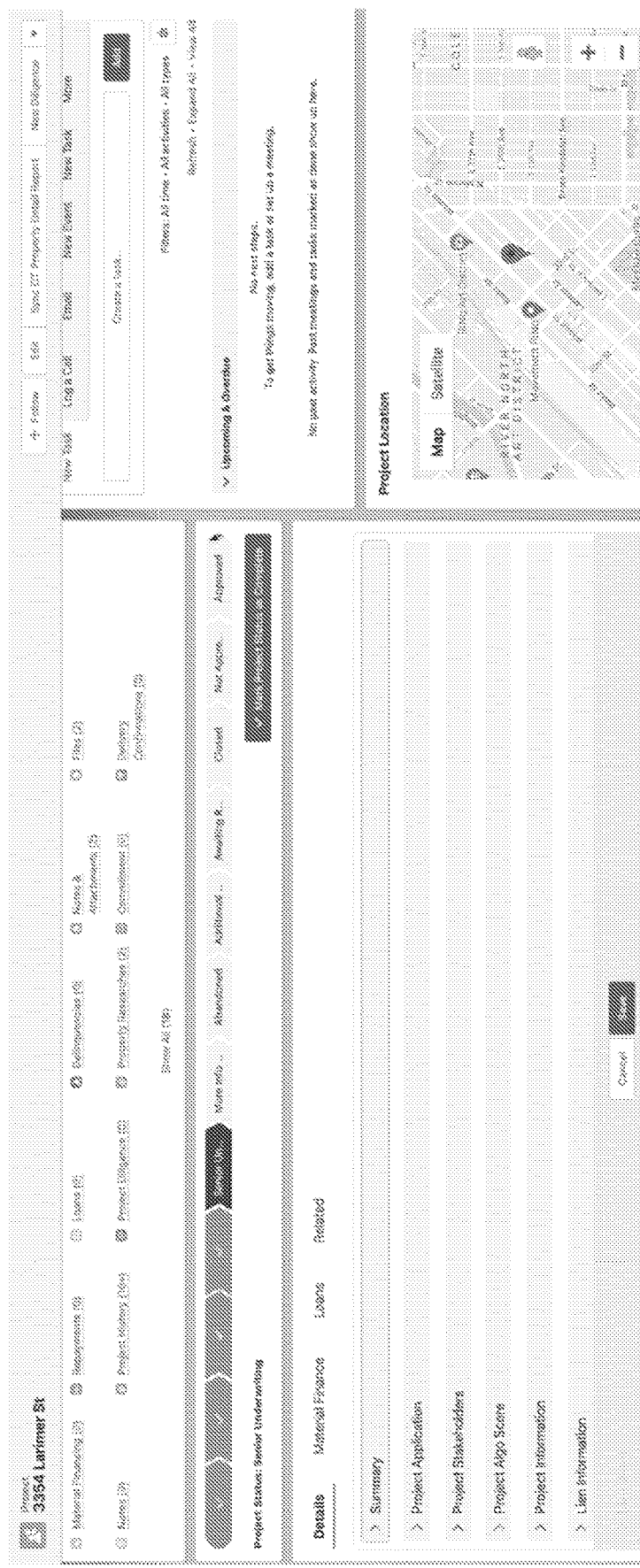
Figure 4C:
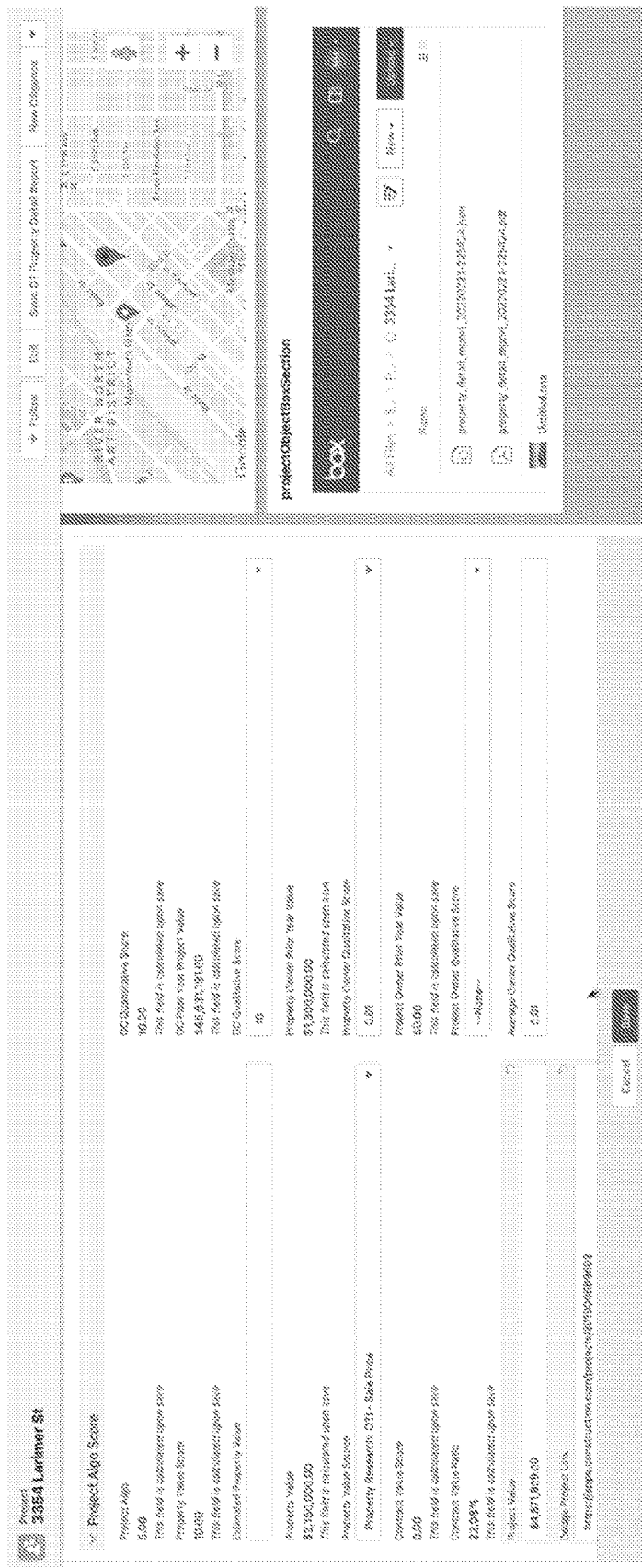
Figure 4D:
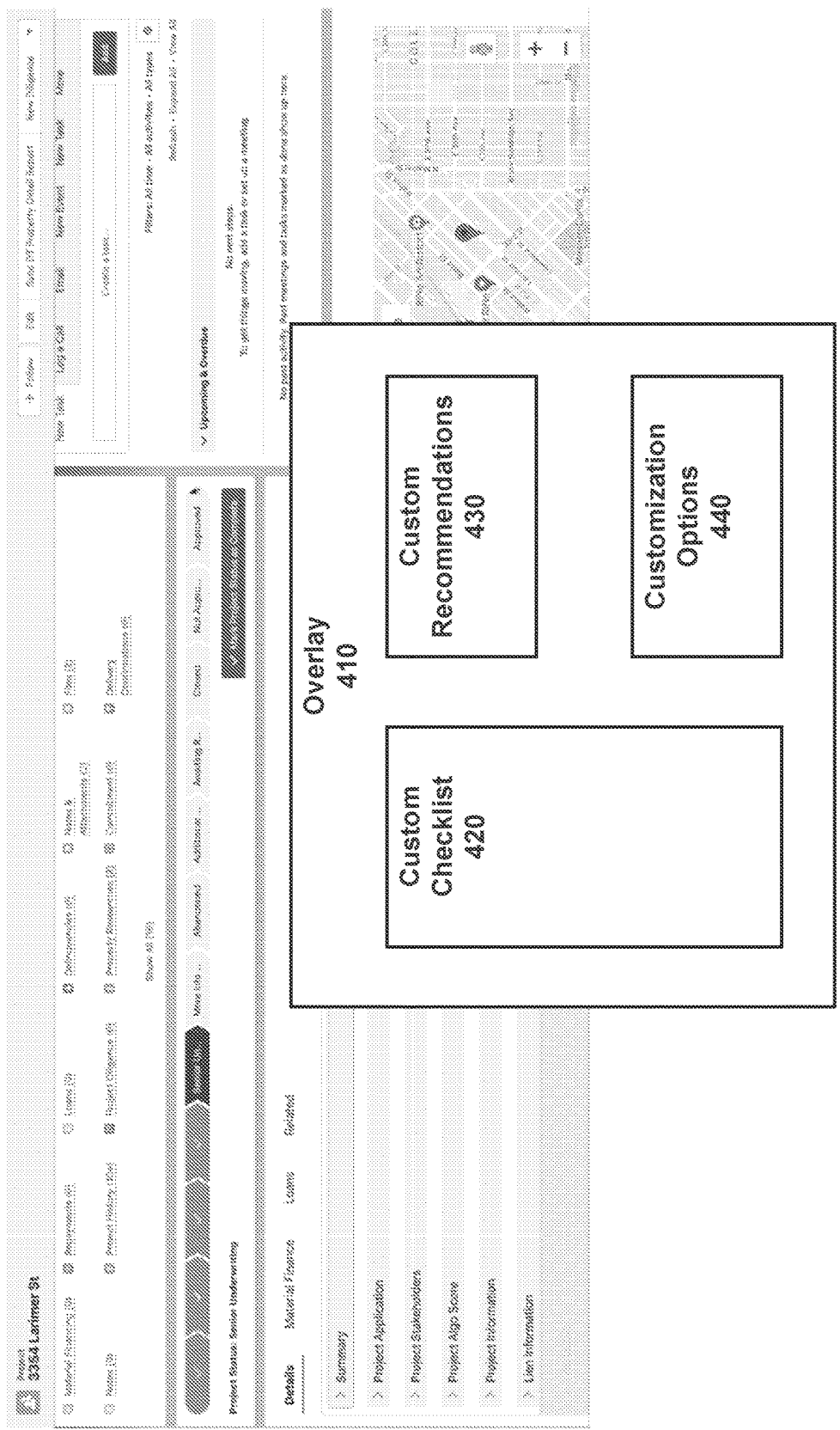
Figure 4E:
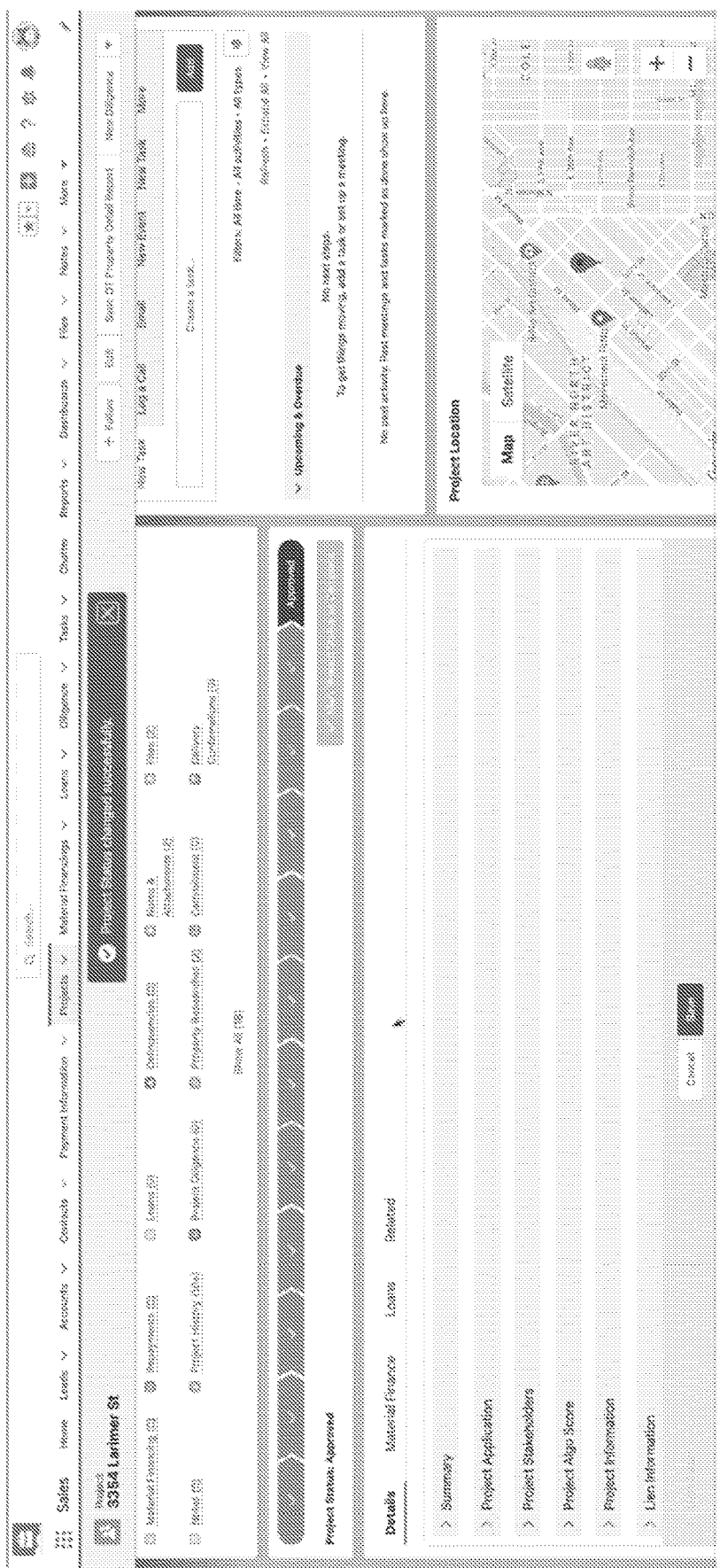

FIGS. 4A-E illustrates exemplary graphic user interfaces that may be generated by a system for automated project assessment and enhancement. Each of the FIGS. 4A-E may be automatically generated and populated in real-time upon being requested and accessed by an assessor device 120. As illustrated, each screenshot includes a variety of different fields for data related to the project, and each of the fields may be populated by one or more of the data sources 125. In various embodiments of the present invention, conflicting data may be resolved by way of predetermined priorities and rules. Alternatively, the conflict may result in a checklist item being generated for presentation within the custom checklist that presents options selectable by the user of assessor device 120. FIG. 4D illustrates an exemplary overlay 410 that includes a custom checklist 420, custom recommendations 430, and further customization options 440, which allows the user of assessor device 120 to specify additional customizations regarding the appearance and presentation of custom dashboard and custom checklists, as well as customizations to the workflows associated with the custom recommendations. The additional customization data may further be captured and stored in historical data 135 and used by AI/machine learning to generate subsequent recommendations for subsequent projects that may share similar project parameters.

FIG. 5 illustrates an exemplary computing system 500 that may be used to implement an embodiment of the present invention. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Processor unit 510 may perform the operations embodied in available software. The processor unit 510 may be a digital signal controller (DSC) for processing the signals received during the methods described herein. The DSC may be a hybrid of microcontrollers and digital signal processors (DSPs). In other instances, the processor unit 510 may be a microcontroller to process the control signals received. The processor unit 510 may be manufactured by different manufacturers such as Microchip, Freescale, and Texas Instruments.

Processor unit 510 may execute instructions out of memory 520. This may include performing operations according to an algorithm that uses various criteria to generate and adjust a project assessment provided to users. Such operations and algorithms may be embodied in application software executed by the processor unit 510 at any of the local or remote computing devices of FIG. 1. The software may include a software framework or application architecture that optimizes ease of use of at least one existing software platform and may extend the capabilities of at least one existing software platform. The application architecture may approximate the actual way users organize and manage electronic files and thus may organize use activities in a natural, coherent manner while delivering use activities through a simple, consistent, and intuitive interface within each application and across applications. The architecture may also be reusable, providing plug-in capability to any number of applications without extensive reprogramming, enabling parties outside of the network environment 100 of FIG. 1 to create components that plug into the architecture. Thus, software or portals in the architecture may be extensible, and new software or portals may be created for the architecture by any party.

Main memory 520 may be used to store the software or the algorithm to perform the methods discussed herein. It can be noted that the main memory 520 may store one or more instructions and data. The data may be related to at least but not limited to various files embodying text-based documents, including agreements between lender and buyer, lien documents, or security documents. The one or more instructions may be instructions that are executable by the processor unit 510 to perform a specific operation for performing the method for utilizing project information to adjust the credit offer of the borrower. Some of the commonly known memory implementations may include but are not limited to, fixed (hard) drives, magnetic tape, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, cloud computing platforms (e.g., Microsoft Azure and Amazon Web Services, AWS), or other types of media/machine-readable medium suitable for storing electronic instructions Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Input devices 560 may also be combined and operate in conjunction with output devices 550 as governed by input/output (I/O) modules. I/O modules may be used by a system administrator with specialized access. The I/O module may comprise I/O devices, display devices, or a group of devices may be augmented reality devices. The I/O devices may be controlled by an I/O controller. Furthermore, an I/O device may also allow storage or an installation medium for the computing devices 110-125. In still other embodiments, the computing devices 110-125 may allow USB connections (not shown) to receive handheld USB storage devices. In further embodiments, an I/O device may be a bridge between a system bus and an external communication bus, e.g., a USB bus, a SCSI bus, a FireWire bus, an Ethernet bus, a Gigabit Ethernet bus, a Fiber Channel bus, or a Thunderbolt bus. In some embodiments, I/O module may further include keyboards, mice, trackpads, trackballs, touchpads, touch mice, multi-touch touchpads and touch mice, pointing device, e.g., a mouse or optical pen, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors.

The I/O module may further include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple iPhone. Some devices allow gesture recognition inputs by combining some of the inputs and outputs. Some devices allow for facial recognition, which may be utilized as an input for different purposes, including authentication and other commands. Devices allow voice recognition and inputs, including, e.g., Microsoft KINECT, SIRI for iPhone by Apple, Google Now, or Google Voice Search. Additional mobile devices have both input and output capabilities, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), or force-based sensing technologies. Some multi-touch devices may allow two or more contact points with the surface, allowing advanced functionality, including, e.g., pinch, spread, rotate, scroll, or other gestures. Further, the computing device 102 could be an optional component and would be utilized in a situation in which the paired wearable device is utilizing the computing device 110-125 as additional memory or computing power or connection to the communication network 105. It can be noted that the computing device 110-125 may be used by system administrators or by client users such as property owners, contractors, sub-contractors, borrowers, and auxiliary users associated with entities such as financial institutions and underwriters.

I/O modules may further be inclusive of network interfaces used to communicate via communication networks (e.g., communication network 105). For example, embodiments of the present invention may provide financial and site planning/progress software applications accessible to one or more computing devices 110-125, which may be associated with different users or entities to perform one or more functions. Such applications may be available at the same location or a location remote from the user. Each application may provide a graphical user interface (GUI) and a network interface for ease of interaction by the computing devices 110-125 resident in the network environment 100 and for facilitating communications therebetween. The network interface of the computing devices 110-125 may be specific to a user, set of users, or type of user, or may be the same for all users or a selected subset of users. The system software may also provide a master network interface set that allows the associated computing device 110-125 to communicate and/or interact with the network interface of one or more other applications, or that allows a computing device 110-125 to simultaneously access a variety of information otherwise available through any portion of the system. Further, the network interface may perform signal transmission and distribution functions within the computing device 110-125. The network interface may connect electronic devices or computing device 110-125 to electrical systems at a control level. Further, the network interface provides many solutions tailored for virtual network deployment and management, which efficiently optimize the distribution and management of virtual workloads and provide maximum scalability and reduced bottleneck impediments to the processes performed in network environment 100. The network interface may be easily integrated into existing hardware and architecture and configured to deploy virtual machine device queues. The network interface may be ideally suited for the consolidation of virtual network traffic without departing from the scope of the disclosure.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

While this invention has been disclosed with reference to specific embodiments, it is apparent that other embodiments and variations of this invention may be devised by others skilled in the art without departing from the true spirit and scope of the invention. It will be appreciated by those skilled in the art that changes could be made to the exemplary embodiments described above without departing from the broad inventive concept thereof. Therefore, it is to be understood that this disclosure is not limited to the particular embodiments disclosed, but it is intended to cover modifications within the spirit and scope of the subject disclosure as disclosed above.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims.

What is claimed is:

1. A method for automated project assessment and enhancement, the method comprising:
   receiving an electronic file over a communication network, wherein the electronic file includes text of a project contract associated with a property;
   analyzing the text within the electronic file to identify a plurality of project parameters of a plurality of different project parameter types indicated by the text;

supplementing each of the identified plurality of project parameters, wherein supplementing each of the identified plurality of project parameters includes:
querying one or more online data sources over the communication network to execute a search of the one or more online data sources in accordance with the associated project parameter type indicated by the text of the electronic file,
receiving supplemental data about the property from the one or more online data sources over the communication network responsive to the search, and adding the supplemental data to the identified plurality of project parameters;
generating a project score to be assigned to the project contract using a scoring algorithm and based on the identified plurality of project parameters and the supplemental data, wherein the assigned project score is below a predetermined threshold;
identifying one or more enhancements that are available for the project contract based on the identified plurality of project parameters and the supplemental data, wherein each enhancement causes an adjustment to the project score according to the scoring algorithm;
generating a recommendation regarding at least one enhancement of the identified one or more enhancements that adjusts the project score to produce an adjusted project score that reaches at least the predetermined threshold;
generating a plurality of links for direct access to a plurality of data sources associated with the project contract, the plurality of data sources including a data source storing the electronic file and at least one of the one or more online data sources; and
causing display, using a display coupled to a computing device associated with the project contract, of a user interface that includes the recommendation and the plurality of links.

2. The method of claim 1, further comprising:
storing historical data in a historical database regarding a plurality of historical projects associated with different project parameters and enhancements; and
iteratively applying a machine learning model to the historical database over time to identify one or more correlations between project scores and at least one of project parameters and enhancements, wherein identifying the one or more enhancements is further based on the identified one or more correlations.

3. The method of claim 2, further comprising:
updating the historical data to include the electronic file that includes the project contract, wherein a next iteration of applying the machine learning model is based on the updated historical data that includes the electronic file.

4. The method of claim 2, further comprising:
filtering the historical data based on one or more of the identified project parameters, wherein the one or more correlations are identified within the filtered historical data.

5. The method of claim 1, further comprising:
generating the user interface for the computing device based on the electronic file, wherein the recommendation is displayed within the user interface.

6. The method of claim 5, further comprising:
continuously receiving supplemental data from the one or more online data sources;
automatically populating the user interface based on the supplemental data as the supplemental data is continuously received; and
storing the supplemental data in association with the electronic file, wherein the user interface is updated to synchronize with the supplemental data being continuously received from the one or more online data sources.

7. The method of claim 6, further comprising:
generating a customized checklist for the electronic file based on the identified project parameters and the supplemental data being continuously received from the one or more online data sources, wherein the customized checklist is part of the user interface.

8. The method of claim 7, wherein the customized checklist includes the plurality of links, wherein the plurality of links are selectable to initiate an associated action item workflow corresponding to one of the identified project parameters, and further comprising updating the customized checklist based on a subset of the continuously received supplemental data indicating completion of the associated action item workflow.

9. The method of claim 8, further comprising:
storing information regarding the completed action item workflow, wherein the stored information includes the subset of the continuously received supplemental data indicating the completion, the subset corresponding to verification data.

10. The method of claim 1, wherein different data sources are searched for different project parameter types, and further comprising selecting one or more application programming interfaces (APIs) based on the different project parameter types, wherein executing the search is based on one or more of the selected APIs.

11. The method of claim 1, further comprising:
identifying that the at least one enhancement is associated with a modification to the project contract, and wherein the recommendation includes the modification.

12. The method of claim 11, wherein the modification is associated with a set of instructions executable by a processor to initiate application of the modification to the project contract.

13. The method of claim 12, further comprising:
generating the set of instructions based on the identified project parameters, wherein applying the modification to a second project contract having different project parameters is based on a different set of instructions.

14. A system for automated project assessment and enhancement, the system comprising:
memory that stores information regarding a plurality of different project parameter types, each project parameter type associated with one or more online data sources;
a communication interface that communicates over a communication network, wherein the communication interface receives an electronic file over the communication network, and wherein the electronic file includes text of a project contract associated with a property; and
a processor that executes instructions stored in the memory, wherein the processor executes the instructions to:
analyze the text within the electronic file to identify a plurality of project parameters of the plurality of different project parameter types indicated by the text, supplement each of the identified plurality of project parameters, wherein supplementing each of the identified plurality of project parameters includes:
querying one or more online data sources over the communication network to execute a search of the one or more online data sources in accordance with the associated project parameter type indicated by the text of the electronic file,
receiving supplemental data about the property from the one or more online data sources over the communication network responsive to the search, and
adding the supplemental data to the identified plurality of project parameters,
generate a project score to be assigned to the project contract using a scoring algorithm and based on the identified plurality of project parameters and the supplemental data, wherein the assigned project score is below a predetermined threshold,
identify one or more enhancements that are available for the project contract based on the identified plurality of project parameters and the supplemental data, wherein each enhancement causes an adjustment to the project score according to the scoring algorithm,
generate a recommendation regarding at least one enhancement of the identified one or more enhancements that adjusts the project score to produce an adjusted project score that reaches at least the predetermined threshold,
generate a plurality of links for direct access to a plurality of data sources associated with the project contract, the plurality of data sources including a data source storing the electronic file and at least one of the one or more online data sources, and
causing display, using a display coupled to a computing device associated with the project contract, of a user interface that includes the recommendation and the plurality of links.

15. The system of claim 14, wherein the memory further includes a historical database that stores historical data regarding a plurality of historical projects associated with different project parameters and enhancements, and wherein the processor executes further instructions to iteratively apply a machine learning model to the historical database over time to identify one or more correlations between project scores and at least one of project parameters and enhancements, wherein identifying the one or more enhancements is further based on the identified one or more correlations.

16. The system of claim 15, wherein the processor executes further instructions to update the historical data to include the electronic file that includes the project contract, wherein a next iteration of applying the machine learning model is based on the updated historical data that includes the electronic file.

17. The system of claim 15, wherein the processor executes further instructions to filter the historical data based on one or more of the identified project parameters, wherein the correlations are identified within the filtered historical data.

18. The system of claim 14, wherein the processor executes further instructions to generate the user interface for the computing device based on the electronic file, wherein the recommendation is displayed within the user interface.

19. The system of claim 18, wherein the communication interface further continuously receives supplemental data from the one or more online data sources, wherein the processor executes further instructions to automatically populate the user interface based on the supplemental data as the supplemental data is continuously received, wherein the memory further stores the supplemental data in association with the electronic file, and wherein the user interface is updated to synchronize with the supplemental data being continuously received from the one or more online data sources.

20. The system of claim 19, wherein the processor executes further instructions to generate a customized checklist for the electronic file based on the identified project parameters and the supplemental data being continuously received from the one or more online data sources, wherein the customized checklist is part of the user interface.

21. The system of claim 20, wherein the customized checklist includes the plurality of links, wherein the plurality of links are selectable to initiate an associated action item workflow corresponding to one of the identified project parameters, and wherein the processor executes further instructions to update the customized checklist based on a subset of the continuously received supplemental data indicating completion of the associated action item workflow.

22. The system of claim 21, wherein the memory further stores information regarding the completed action item workflow, wherein the stored information includes the subset of the continuously received supplemental data indicating the completion, the subset corresponding to verification data.

23. The system of claim 14, wherein different data sources are searched for different project parameter types, wherein the processor executes further instructions to select one or more application programming interfaces (APIs) based on the different project parameter types, and wherein the processor executes the search based on one or more of the selected APIs.

24. The system of claim 14, wherein the processor executes further instructions to identify that the at least one enhancement is associated with a modification to the project contract, and wherein the recommendation includes the modification.

25. The system of claim 24, wherein the modification is associated with a set of instructions executable by the processor to initiate application of the modification to the project contract.

26. The system of claim 25, wherein the processor executes further instructions to generate the set of instructions based on the identified project parameters, wherein the modification is applicable to a second project contract having different project parameters based on a different set of instructions.

27. A non-transitory, computer-readable storage medium, having embodied thereon a program executable by a processor to perform a method for automated project assessment and enhancement, the method comprising:
receiving an electronic file over a communication network, wherein the electronic file includes text of a project contract associated with a property;
analyzing the text within the electronic file to identify a plurality of project parameters of a plurality of different project parameter types indicated by the text;
supplementing each of the identified plurality of project parameters, wherein supplementing each of the identified plurality of project parameters includes:
querying one or more online data sources over the communication network to execute a search of the one or more online data sources in accordance with the associated project parameter type indicated by the text of the electronic file,
receiving supplemental data about the property from the one or more online data sources over the communication network responsive to the search, and
adding the supplemental data to the identified plurality of project parameters;

generating a project score to be assigned to the project contract using a scoring algorithm and based on the identified plurality of project parameters and the supplemental data, wherein the assigned project score is below a predetermined threshold;

identifying one or more enhancements that are available for the project contract based on the identified plurality of project parameters and the supplemental data, wherein each enhancement causes an adjustment to the project score according to the scoring algorithm;

generating a recommendation regarding at least one enhancement of the identified one or more enhancements that adjusts the project score to produce an adjusted project score that reaches at least the predetermined threshold;

generating a plurality of links for direct access to a plurality of data sources associated with the project contract, the plurality of data sources including a data source storing the electronic file and at least one of the one or more online data sources; and causing display, using a display coupled to a computing device associated with the project contract, of a user interface that includes the recommendation and the plurality of links.

* * * * *